United States Patent Office 3,085,687
Patented Apr. 16, 1963

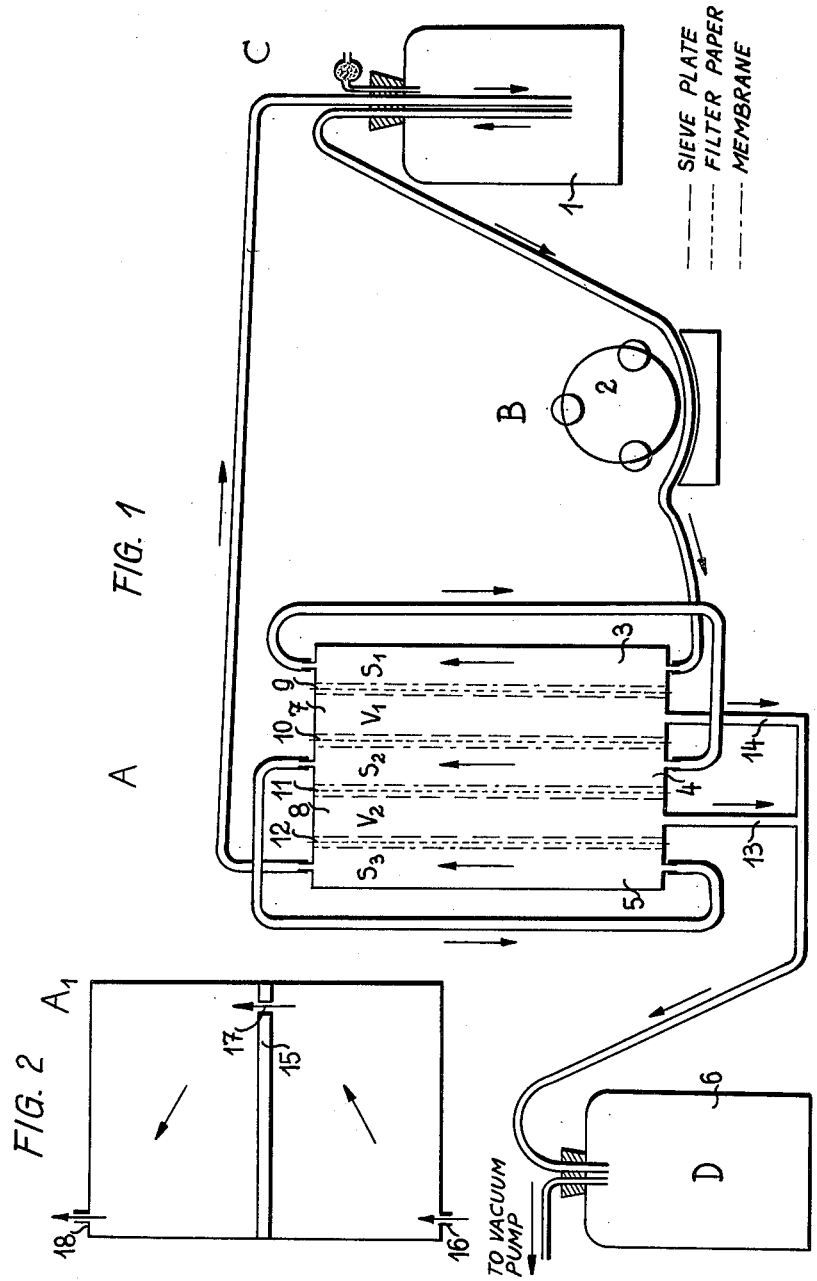

3,085,687
APPARATUS FOR THE ULTRAFILTRATION
OF SOLUTIONS
Georg Erbach, Marburg (Lahn), Germany, assignor to Behringwerke Aktiengesellschaft, Marburg (Lahn), Germany, a corporation of Germany
Filed Mar. 22, 1960, Ser. No. 16,873
Claims priority, application Germany Mar. 26, 1959
1 Claim. (Cl. 210—195)

The present invention relates to an apparatus for ultrafiltration, i.e. for concentrating solutions whose dissolved particles are of such a high molecular weight that they are retained by a semipermeable membrane.

Devices are known that are provided with semipermeable membranes and by means of which solutions are concentrated, either by reduced or excess pressure or by making use of osmotic pressure through dialysis against a solution of higher osmotic pressure. Hitherto, it was not possible to effect continuous and automatic concentration by means of such apparatus since in all apparatus for ultrafiltration a layer of the dissolved particles deposited on the membrane, clogged the pores of said membrane and thus prevented further concentration.

J. L. Gardon and S. G. Mason (Canad. J. Chem. 33, 1625, 1955) recommended to keep the solution to be concentrated moving by means of a diaphragm pump. This method shows the drawbacks that the diaphragm pump has to be run by an oscillating mercury pump which, in its turn, has to be operated by an aspirator. Such an arrangement is expensive, it requires high expenditure of energy and special skill in operating it. The membranes of the pump are of limited durability. Time-consuming measures are necessary for rendering the diaphragm pump sterile. As regards the mercury pump there is special danger of breaking.

The apparatus of the present invention operates according to the following principle: The solution to be concentrated is pumped by means of a hose pump or a closed centrifugal pump from a storage tank into the substance chambers subdivided one or several times of the ultrafiltration apparatus and from there back into the storage tank. The solution is thus passed in a permanent cycle along the membranes and is caused to circulate while the membranes are intensely utilized. On the other side of the membrane a vacuum pump is attached and a mean reduced pressure (~15–50 mm. of mercury) is produced. The high-molecular weight particles for which the membrane is impermeable remain in the circulating solution. The smaller molecules, the inorganic salts, but above all the solvent which in most cases consists of water, penetrate the pores of the membrane and appear as filtrate behind the membrane.

All details of the apparatus for ultrafiltration can be taken from the drawing and the description. FIG. 1 shows schematically the apparatus, i.e. the arrangement of its main parts. FIG. 2 shows one chamber of the apparatus in detail. The apparatus consists of a storage tank 1, a hose pump 2 or a closed circulating pump, substance chambers 3, 4 and 5, arranged alternately side by side and connected with each other, vacuum chambers 7 and 8 connected with each other and also with a collector 6 for the filtrate, each chamber being divided by semipermeable membranes 9, 10, 11 and 12. The solution to be filtered is pumped in a cycle from the storage tank 1 by means of pump 2 through the substance chambers 3, 4 and 5, while through the collector 6 by means of vacuum pipe lines 13 and 14 a pressure of preferably 15–50 mm. of mercury is maintained in the vacuum chambers 7 and 8. The ultrafiltration apparatus is made of plastic or metal and contains three substance chambers 3, 4 and 5, and two vacuum chambers 7 and 8, more chambers being also possible. The single chambers are formed in such a manner that plastic or metal frames are fitted together and closed on both sides by a plastic, metal or glass plate which is preferably fixed to the adjoining frame. All frames are held together by a metal clip. Vacuum chambers 7 and 8 are shut off by a screen plate from the substance chambers 3, 4 and 5. On the screen plate, on the side towards the substance chambers, a semipermeable membrane is placed. A filter paper of the same size between screen plate and membrane has proved favorable for protecting the membrane. The substance chambers 3, 4 and 5 are suitably halved by a horizontal ledge (FIGURE 2, No. 15). The ledge is provided with a perforation 17 from the lower to the upper section. The entrance 16 of the chamber on the bottom, the perforation 17 of the ledge and the outlet 18 are arranged in such a way that the liquid has to pass the membrane twice or several times diagonally. Thus, the membrane is better utilized. The points of contact between the substance and vacuum chambers are packed by means of rubber plates correspondingly cut out. The successive substance chambers and the successive vacuum chambers are connected with each other by a pipe. The first and the last substance chamber are connected with the storage bottle, the first one at the bottom and the last one at the top. The vacuum chambers are connected with the filtrate bottle.

The hose pump 2 consists of an electromotor whose axis is extended on the one side. At the end of the extended portion a disc is placed to which three small wheels are fixed rotating round the axis. At the base plate of the electromotor a plastic tube is fixed in such a way that it is squeezed by the three small wheels every time the axis rotates. If the liquid is in the tube it is pushed forward a little and new liquid is aspirated which is then pushed forward by the following wheel.

The storage bottle 1 is closed by a rubber stopper perforated three times, one perforation serving for the supply pipe to the ultrafiltration apparatus, one perforation for the tube from the apparatus and a third one for an air tube.

The filtrate bottle 6 is provided with a rubber stopper perforated two times. One perforation leads to the ultrafiltration apparatus, the other to the vacuum pump. The bottle has to be tested with a reduced pressure that corresponds at least to the reduced pressure being applied in the ultrafiltration.

For ultrafiltration the solution to be concentrated is pumped by means of the hose pump 2 or of a closed circulating pump from the storage bottle 1 into the first substance chamber 3 and so on until the solution flows back into the storage bottle 1. The solution to be filtered is thus pumped in continuous circulation from the storage bottle into the ultrafiltration apparatus and from there into the storage bottle. A vacuum pump is then joined by means of which a moderate vacuum is produced behind the membranes (about 15 to 50 mm. Hg).

The hose pump causes the solution to circulate in a constant cycle during the ultrafiltration. A special advantage of the apparatus of the invention resides in the fact that this circulation is effected by means of a hose pump which is of simple design, of low initial cost and inexpensive in its maintenance and which requires no special attendance. A plastic tube about 20 cms. long is the only part of the hose pump coming into contact with the solution. This tube is easily made sterile, for example by means of a 2% formaldehyde solution.

A further advantage is achieved if the substance chambers are divided once or several times (see FIG. 2). The openings from one section to the other are each in the opposite corner of the section so that the liquid flow is diagonally passed through each section along the membrane. By this arrangement the whole area of the membrane is evenly utilized and in no place in the chamber is the flow of liquid weak, nor does such flow stop.

The substance and vacuum chambers are connected in such a manner that on each side of the substance chambers a vacuum chamber is found. Thus, on both sides of each substance chamber a membrane can be fixed. A further advantage of this arrangement resides in the fact that it saves space.

The ultrafiltration apparatus permits concentrating the following liquids:

(1) 60 liters of human serum albumin with a protein content of 4.35% are concentrated within 24 hours to 10 liters (protein content 26).

(2) 36 liters of a poliomyelitis virus solution inactivated by means of formaldehyde solution are concentrated within 38 hours to 0.45 liter. In the concentrate the virus was detected immunologically and by the sedimentation constant of 164 S (cf. for example A. Polson and G. Selzer: Proc. Soc. Exp. Biol. Med. 81, 218 (1952) with $S_{20}=163$ S; and C. E. Schwerdt and F. L. Schaffer: Ann. N.Y. Acad. Sci. 61, 740 (1955) with $S_{20}=154$ S). In order to test the ultrafiltrate for absence of viruses 10 liters are concentrated to some milliliters. However, no precipitation with the specific antiserum could be observed and in the ultracentrifuge no component could be found in the sedimentation range characteristic of the poliomyelitis virus.

(3) 30 liters of cattle serum gamma-globulin (2.6% of protein) are concentrated within 20 hours to 5 liters. The protein content amounted to 16% after concentration.

(4) 120 liters of tetanus horse serum with a protein content of 0.75% are concentrated within 20 hours to 10 liters. The protein content amounted to 9% after concentration.

(5) 50 liters of tetanus formaldehyde toxoid with 18 Lf are concentrated within 24 hours to 5 liters with 170 Lf. (By one flocculation unit Lf of a toxoid there is understood the amount which causes flocculation of one unit of antitoxin.)

(6) 25 liters of nucleic acid from yeast having a concentration of 0.10% are concentrated within 5 hours to 4 liters (content of nucleic acid 0.61%).

I claim:

An apparatus for the concentration of a solution by continuous ultrafiltration, said apparatus comprising a storage vessel, at atmospheric pressure, for a solution to be filtered, a collecting vessel for filtrate, a plurality of filtration chambers and a plurality of vacuum chambers alternately adjacently positioned and separated by semipermeable membranes, each of said filtration chambers and vacuum chambers having a top and a bottom, first conduit means having pump means therein and connecting said storage vessel with the bottom of a first of said filtration chambers, serially interconnecting the top of each filtration chamber with the bottom of a next succeeding filtration chamber, and connecting the top of a last of said filtration chambers with said storage vessel, whereby the solution to be filtered is continuously circulated by said pump means from said storage vessel through said filtration chambers successively from the first to the last and is then returned to said storage vessel, the flow of solution in each of said filtration chambers being upward, second conduit means separately connecting the bottom of each vacuum chamber with a common conduit connected to said collecting vessel for filtrate, and vacuum means, in communication with said vacuum chambers through said collecting vessel and said second conduit means, for maintaining a pressure of 15–20 mm. Hg in said vacuum chambers, whereby filtrate collected in said vacuum chambers is withdrawn under vacuum from said vacuum chambers to said collecting vessel for filtrate.

References Cited in the file of this patent
UNITED STATES PATENTS

| | | |
|---|---|---|
| 1,503,892 | Grindrod | Aug. 5, 1924 |
| 2,127,791 | Stevens et al. | Aug. 23, 1938 |
| 2,159,434 | Frey | May 23, 1939 |
| 2,540,152 | Weller | Feb. 6, 1951 |
| 2,864,506 | Hiskey | Dec. 16, 1958 |

FOREIGN PATENTS

| | | |
|---|---|---|
| 21,999 | Germany | Apr. 27, 1883 |